April 9, 1963   M. R. FERRERUELA   3,085,147
METHOD AND MACHINE FOR COLD MANUFACTURING OF PIPES
Filed March 28, 1960   4 Sheets-Sheet 1

INVENTOR.
Miguel Royo Ferreruela
BY Michael S. Striker

April 9, 1963  M. R. FERRERUELA  3,085,147
METHOD AND MACHINE FOR COLD MANUFACTURING OF PIPES
Filed March 28, 1960  4 Sheets-Sheet 2

INVENTOR.
Miguel Royo Ferreruela
BY
Michael S. Striker
Atty

April 9, 1963   M. R. FERRERUELA   3,085,147
METHOD AND MACHINE FOR COLD MANUFACTURING OF PIPES
Filed March 28, 1960   4 Sheets-Sheet 3
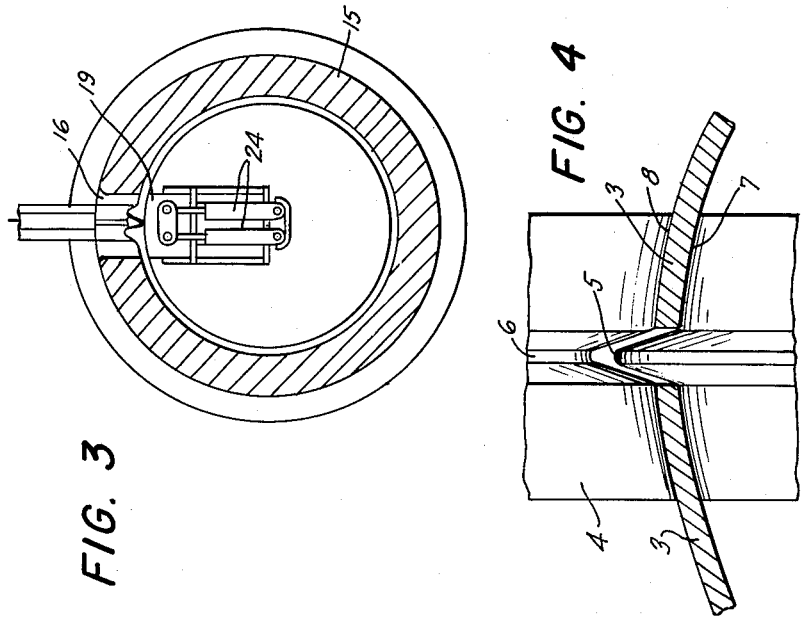
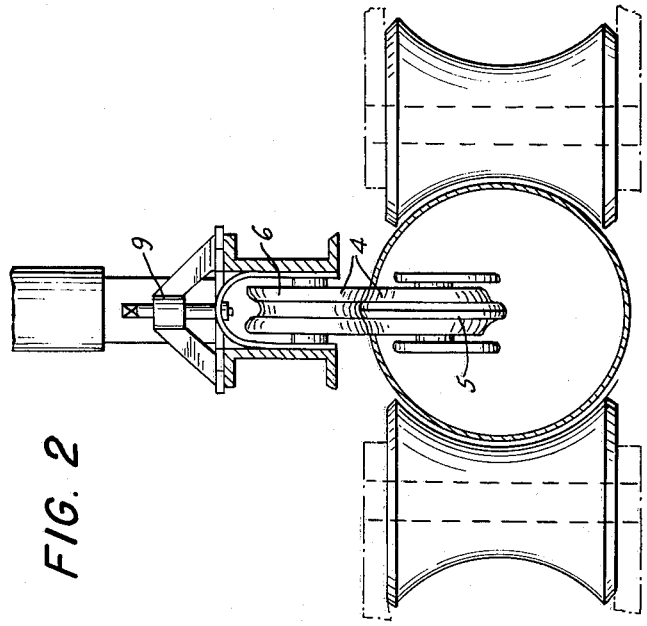
INVENTOR.
Miguel Royo Ferreruela
BY
Michael S. Striker
Attorney

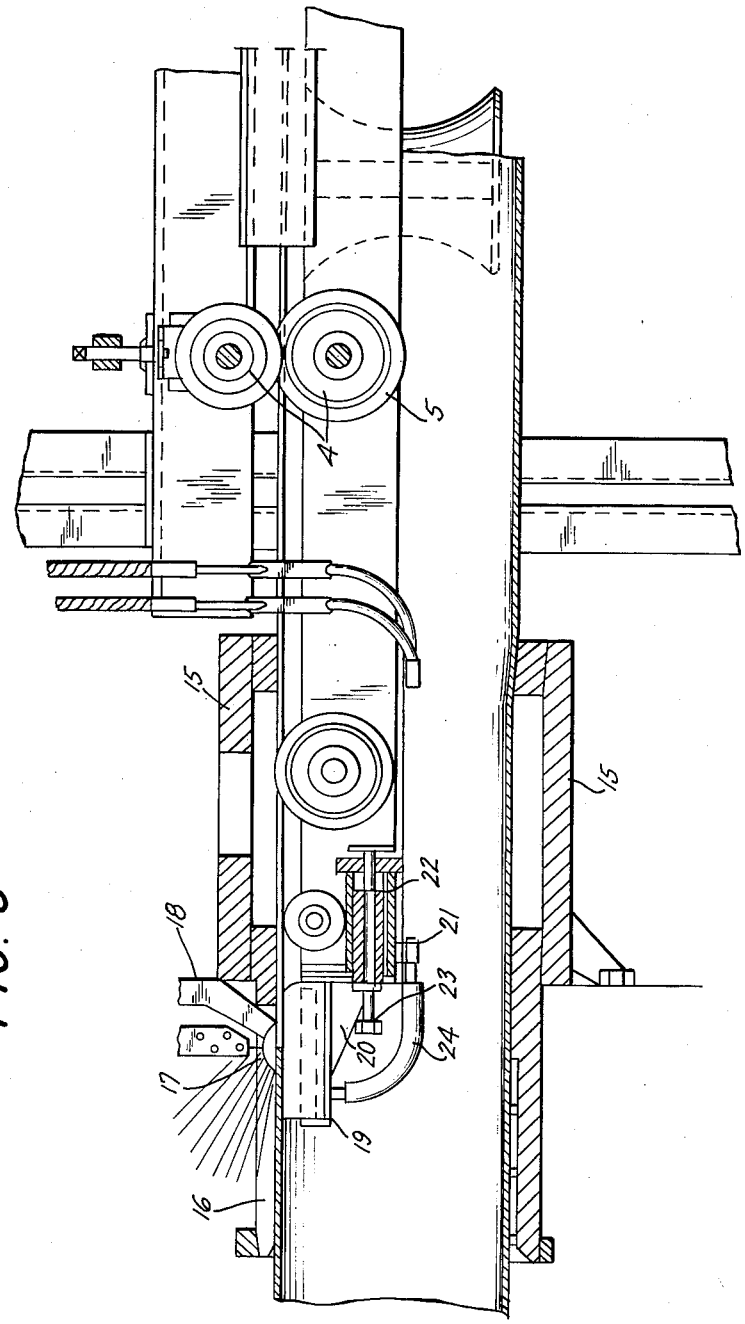

3,085,147
METHOD AND MACHINE FOR COLD
MANUFACTURING OF PIPES
Miguel Royo Ferreruela, Peru St. 277,
Buenos Aires, Argentina
Filed Mar. 28, 1960, Ser. No. 18,119
Claims priority, application Spain June 5, 1959
12 Claims. (Cl. 219—60)

This invention relates to a new system for manufacturing seamed pipes, and is the result of a new idea.

As its embodiment is both simple and economical, it is foreseen that, no doubt, it will be promptly accepted and applied in practice.

Up to the present, seamed tubes are manufactured from a metal sheet or strip, shaping the pipe by curving cylindrically or spirally the strip and then joining the edges by welding.

The system and machine of the present invention relates exclusively to the manufacture of pipes from cylindrically shaped sheets, in which the edges are joined by means of rectilinear welding.

Machines of this type known up to the present are very expensive, of intricate construction and consume considerable energy. These machines consist in sets of shaping rollers, all of which are powered, as in the case of rolling mills (e.g. the "Yoder" machines). In these machines, the metal sheet is cut to the required length beforehand, and the sheet is then placed into the first set of rollers which drag and deliver the sheet to consecutive sets of rollers of different curvature radii until the pipe is finally shaped and then the edges are brought near to each other and welded longitudinally.

In order to do away with the shaping rollers, the possibility of pre-moulding the sheet was considered, giving the same an almost cylindrical primary curvature to be afterwards improved until obtaining a uniform radius of curvature and then calibrating the cylinder in a drawing die, passing the sheet by direct pulling from a suitable means. A test model or prototype was thus developed and constructed, which has exceeded all the calculations of efficiency in speed, economy and perfection and which is the base of the present invention.

Figure 1A:
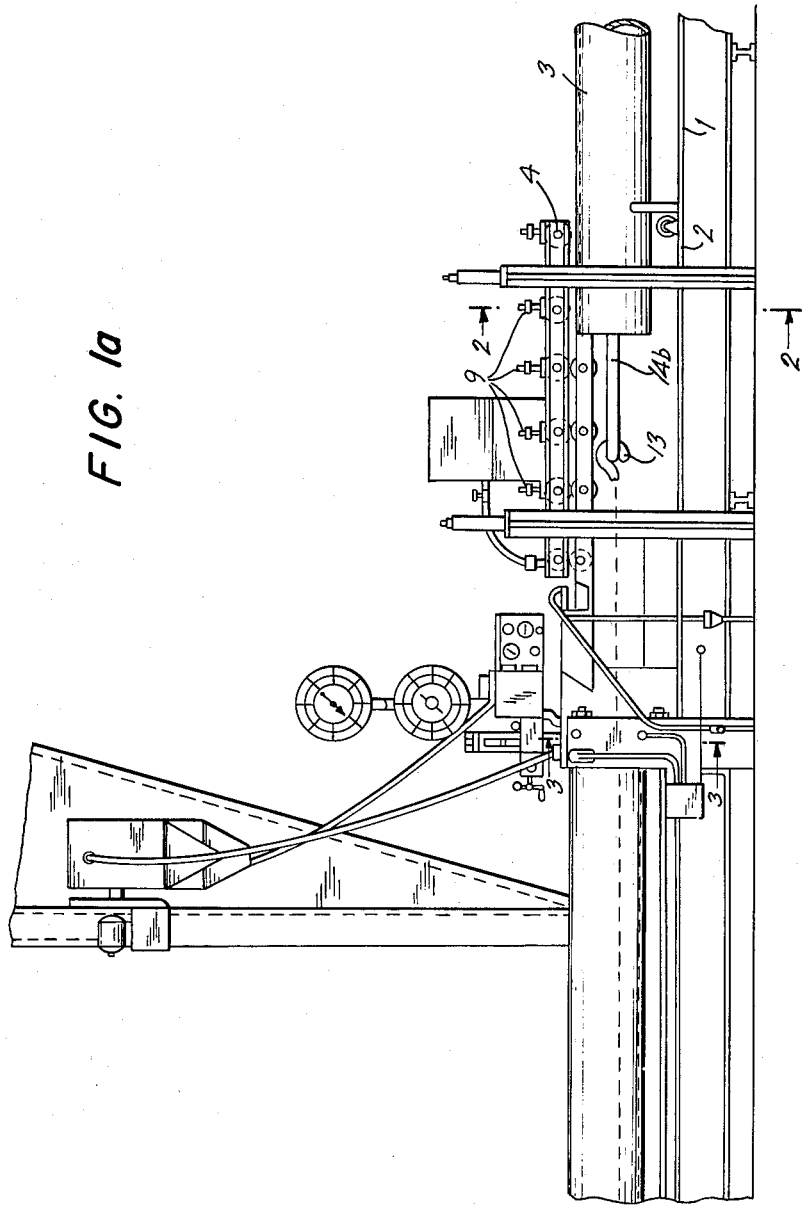
Figure 1B:
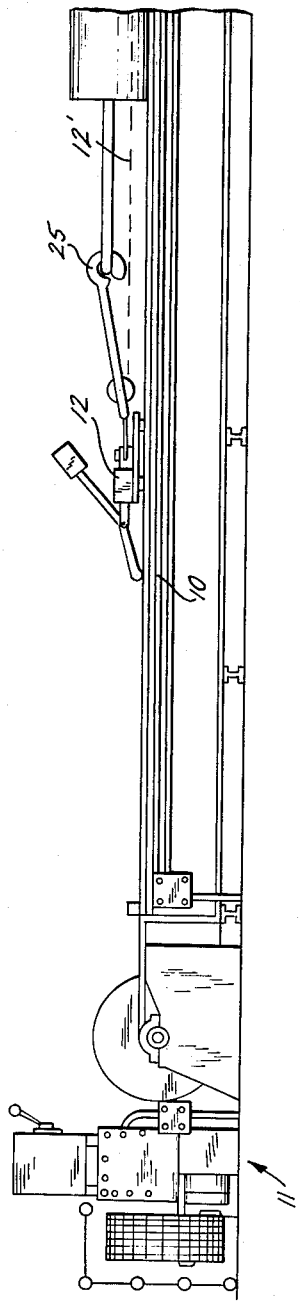

In order that the present invention may be more clearly understood, a preferred embodiment thereof has been shown as a non-limitative example, in the five accompanying figures, wherein:

FIGURE 1(a) is a side view of the machine.
FIGURE 1(b) is a continuation of the above figure.
FIGURE 2 is an enlarged sectional view taken along line A—B of FIGURE 1(a), showing a set of rollers for the correction of the curvature at the edges of the sheet brought near to each other.
FIGURE 3 is a sectional view taken along line C—D of the above FIGURE 1(a).
FIGURE 4 is an enlarged partial view of a set of rollers for the correction of the curvature radius of the pipe.
FIGURE 5 is an enlarged partial sectional view, showing the zone where the longitudinal welding is effected.

Similar reference characters are used to indicate like or corresponding parts throughout the drawings.

As shown in the drawings, the preferred machine has a platform 1, provided with a plurality of rollers 2, above which the pre-moulded pipe 3 can slide freely. As the sheet for the said pipe has been shaped curvedly in nearby presses and dies, its shape is almost cylindrical. Both side edges of the same have been brought near to each other leaving a gap in between them. The pipe thus prepared is placed on platform 1, in such a way that the gap coincides with the annular projections of sets of male and female rollers 4. The annular projection 5 is arranged in between the edges of the pipe. The female rollers receive the said annular projections in their grooves 6. The shape of these grooves coincides with the said projections. The cylindrical surfaces 7 and 8, located at both sides of the annular projections 5 and coincident grooves 6, are substantially spaced as to allow the pipe to be inserted in between them. The said projections and grooves press the pipe rather loosely and correct the curvature radius of the same as it passes along. A plurality of these sets of correcting rollers have been arranged, one next to the other, provided with their own regulation means 9, capable of varying the distance in between surfaces 7 and 8 according to the different thicknesses of the sheet and in relation with the pressure required for the correction of the radius.

The pulling is effected by means of the endless chain 10 (FIGURE 1(b)), the motoring element of which is indicated in 11. To this chain is coupled the hooking element of a carriage 12, which is slidably mounted on corresponding guides. Carriage 12 is connected through a chain or cable 12' to a crossbar 13 arranged in between two rods 14 welded to the starting end of the pre-moulded pipe. In this manner the said pipe is forced through the set of rollers 4 and a drawing die 15 which finally calibrates the pipe. This die is provided with an opened upper zone 16, through which project electrode 17 and the conduit 18 for the flux material. This opening coincides with the pipe gap to be filled in by welding. Mass 19 of the welding equipment is located directly underneath the electrode and arranged inside the pipe, and is suitably cooled by means of pressurised hydraulic circuits. Mass 19 is held in a support 20, which adapts through a truncated cone shaped piece 21, of the "Morse" type, into a related opening 22 and may be adjusted by means of screw 23. The cooling medium circulates through conduits 24.

When the pre-moulded pipe arrives to the zone of the electrode, carriage 12 is arranged in the proximity of the starting end of the pipe. Hook 25 is engaged into crossbar 13, while chain 12' is coupled to another pre-moulded pipe. Thus continuity in the manufacture is obtained, as while one pipe is under the calibration and welding process, the next pipe is being pulled at the same time.

No doubt that in carrying out the present invention in a practical form, modifications might be introduced in details of construction and/or forms of the described machine, without departing from the fundamental principles, which are clearly set forth in the following claims.

I claim:

1. In a method for manufacturing pipes by cold-forming and welding, the steps of: cold preforming metal strip stock to shape it into a nearly cylindrical tubular member, leaving a predetermined gap between the edges located adjacent to each other in the performed tubular member; moving by pulling action said performed nearly cylindrical tubular member in a predetermined direction longitudinal there of and finish-forming, during such movement, to correct curvature of the marginal portions of said tubular member adjacent to said edges, respectively; moving by said pulling action the resulting finish-formed tubular member through sizing die means of predetermined diameter for calibrating said tubular member to final dimensions; joining said edges by continuous welding in that area of said tubular member which is being contained within said sizing die means while being moved therethrough; and applying flux material to said edges within said sizing die means immediately before the welding operation.

2. In an apparatus for manufacturing pipes by cold-forming and welding, in combination, preforming means for fashioning metal strip stock cold into a nearly cylindrical tubular member, leaving a predetermined gap between the edges located adjacent each other in said tubular member; at least one set of idler roll means comprising a male and a female roll cooperating with each other shaped and arranged to engage from outside and inside, respectively, said tubular member along the marginal portions thereof adjacent to said edges, respectively, for finish-forming said marginal portions to correct curvature while said tubular member is moved to pass between said idler roll means; power-operated moving means for pulling said tubular member in longitudinal direction thereof so as to pass between said idler roll means; sizing die means of predetermined diameter located along the path of said tubular member pulled by said moving means through said die means after passing said idler roll means, for calibrating said tubular member to final dimensions, said sizing die means having at least one lateral opening in alignment with said gap in said tubular member, and welding means located in the area of said lateral opening of said sizing die means for continuously joining said edges of said tubular member by welding in that portion of the latter which is contained within said sizing die means while being moved therethrough.

3. An apparatus according to claim 2, wherein said idler roll means includes guide means on at least one of said rolls for maintaining said gap and edges by engagement therewith circumferentially in a predetermined position relative to said opening in said sizing die means.

4. An apparatus according to claim 3, wherein said welding means are electrical welding means comprising electrode means arranged to project toward the outside of said tubular member and backing means arranged inside said tubular member.

5. An apparatus according to claim 4, wherein said backing means are exchangeably and adjustably mounted.

6. An apparatus according to claim 5, wherein said welding means include cooling means for cooling said backing means by circulation of a cooling fluid.

7. An apparatus according to claim 6, wherein said welding means include flux applicator means for continuously applying flux material to said edges of said tubular member in an area of said edges which is spaced, in direction opposite to that of the movement of said tubular member from the area of the welding operation.

8. An apparatus according to claim 2, wherein said moving means include an endless travelling transporting means and detachable coupling means for establishing a pulling connection between the forward end of said tubular member and said transporting means.

9. An apparatus according to claim 4, wherein said moving means include an endless travelling transporting means and detachable coupling means for establishing a pulling connection between the forward end of said tubular member and said transporting means.

10. An apparatus according to claim 7, wherein said moving means include an endless travelling transporting means and detachable coupling for establishing a pulling connection between the forward end of said tubular member and said transporting means.

11. In a method for manufacturing pipes from preformed tubular members each of which has a nearly cylindrical tubular configuration and a pair of longitudinal edges adjacent to but spaced from each other and defining a longitudinal gap therebetween, the steps of advancing each tubular member with respect to shaping rollers which correct the curvature of marginal portions of each tubular member adjacent to said edges thereof; then, while the tubular member continues to advance, moving the same through a sizing die means of predetermined diameter for calibrating the tubular member to final dimensions; and finally welding, while the tubular member continues to advance through said sizing die means, said edges to each other at a part of the tubular member which is still within said sizing die means, so that when each tubular member issues from the sizing die means it has the form of a completed pipe.

12. In an apparatus for manufacturing pipes, in combination, roll means for engaging a preformed tubular member having longitudinal edges adjacent to but spaced from each other at said edges thereof for finish-forming marginal portions of said tubular member at said edges thereof to correct curvature while said tubular member moves longitudinally with respect to said roll means; sizing die means of predetermined diameter located along the path of longitudinal movement of said tubular member after the latter moves beyond said roll means and receiving said tubular member during longitudinal movement thereof for calibrating said tubular member to final dimensions, said sizing die means having at least one lateral opening in alignment with the gap between the longitudinal edges of said tubular member; advancing means cooperating with said tubular member for longitudinally advancing the same with respect to said roll means and said die means; and welding means located in the area of said lateral opening of said die means for continuously joining said edges of said tubular member by welding at that portion of the tubular member which is within said sizing die means while being advanced therethrough by said advancing means.

References Cited in the file of this patent

UNITED STATES PATENTS

| | | |
|---|---|---|
| 611,222 | Ries | Sept. 20, 1898 |
| 2,024,485 | Sussman | Dec. 17, 1935 |
| 2,693,632 | Heussner | Nov. 9, 1954 |
| 2,786,933 | Hume | Mar. 26, 1959 |

FOREIGN PATENTS

| | | |
|---|---|---|
| 472,634 | Canada | Apr. 3, 1951 |